US010168462B2

(12) United States Patent
Lee et al.

(10) Patent No.: US 10,168,462 B2
(45) Date of Patent: Jan. 1, 2019

(54) BACKLIGHT UNIT INCLUDING LIGHT GUIDE PLATE HAVING INCLINED REFLECTIVE SURFACE AND DISPLAY DEVICE INCLUDING THE SAME

(71) Applicant: Samsung Display Co., Ltd., Yongin-si, Gyeonggi-Do (KR)

(72) Inventors: Donghyeon Lee, Seoul (KR); Junwoo You, Seongnam-si (KR); Yongkyu Kang, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 143 days.

(21) Appl. No.: 14/995,289

(22) Filed: Jan. 14, 2016

(65) Prior Publication Data

US 2016/0363712 A1    Dec. 15, 2016

(30) Foreign Application Priority Data

Jun. 10, 2015    (KR) .......................... 10-2015-0081826

(51) Int. Cl.
*G02B 6/10*    (2006.01)
*F21V 8/00*    (2006.01)

(52) U.S. Cl.
CPC ......... *G02B 6/0031* (2013.01); *G02B 6/0018* (2013.01); *G02B 6/0023* (2013.01); *G02B 6/0068* (2013.01); *G02B 6/0091* (2013.01)

(58) Field of Classification Search
CPC .. G02B 6/0026; G02B 6/0031; G02B 6/0068; G02B 6/0073; G02F 1/133524; G02F 1/133615; G02F 2001/01791
See application file for complete search history.

(56) References Cited

U.S. PATENT DOCUMENTS

| 5,528,709 A * | 6/1996 | Koike ................. G02B 6/0041 362/612 |
| 8,267,563 B2 | 9/2012 | Kim et al. |
| 8,665,396 B2 * | 3/2014 | Tang ................. G02F 1/133553 349/62 |

(Continued)

FOREIGN PATENT DOCUMENTS

| JP | 2002-100231 | * | 4/2002 | ............... F21V 8/00 |
| KR | 1020060032434 A | | 4/2006 | |

(Continued)

OTHER PUBLICATIONS

Japan 2002-100231, Apr. 5, 2002, English Translation.*

*Primary Examiner* — Peggy Neils
(74) *Attorney, Agent, or Firm* — Cantor Colburn LLP

(57) ABSTRACT

A backlight unit includes: a point light source which generates light, a light guide plate defining upper and lower surfaces thereof opposing one another, a side surface provided in plural each connecting the upper and lower surfaces to each other; and among the plural side surfaces a light-incident side surface thereof at which the point light source is disposed and on which is incident the light generated from the point light source; and a reflective side surface thereof which is adjacent to the light-incident side surface and reflects light within the light guide plate, and which forms a first angle with respect to the light-incident side surface; and a wavelength converting unit between the light guide plate and the point light source.

14 Claims, 7 Drawing Sheets

(56) References Cited

U.S. PATENT DOCUMENTS

| | | | |
|---|---|---|---|
| 8,757,862 B2* | 6/2014 | Lee | F21S 8/00 |
| | | | 349/58 |
| 8,814,415 B2 | 8/2014 | Kim et al. | |
| 9,158,055 B2* | 10/2015 | Shin | G02B 6/0018 |
| 9,244,213 B2* | 1/2016 | Itoh | G02B 6/0068 |
| 9,268,080 B2* | 2/2016 | Lee | G02B 6/0011 |
| 9,671,546 B2* | 6/2017 | Baek | G02B 6/0031 |
| 9,804,320 B2* | 10/2017 | Okano | G02B 6/0021 |
| 2008/0297698 A1 | 12/2008 | Cha et al. | |
| 2013/0050612 A1 | 2/2013 | Hur et al. | |
| 2014/0160723 A1* | 6/2014 | Davis | F21V 7/10 |
| | | | 362/84 |
| 2015/0234111 A1* | 8/2015 | Lee | G02B 6/0023 |
| | | | 362/608 |
| 2016/0018590 A1* | 1/2016 | Uchida | G02B 6/0046 |
| | | | 362/611 |

FOREIGN PATENT DOCUMENTS

| | | |
|---|---|---|
| KR | 1020100122539 A | 11/2010 |
| KR | 1020110119124 A | 11/2011 |

\* cited by examiner

BACKLIGHT UNIT INCLUDING LIGHT GUIDE PLATE HAVING INCLINED REFLECTIVE SURFACE AND DISPLAY DEVICE INCLUDING THE SAME

This application claims priority to Korean Patent Application No. 10-2015-0081826, filed on Jun. 10, 2015, and all the benefits accruing therefrom under 35 U.S.C. § 119, the contents of which in their entirety are herein incorporated by reference.

BACKGROUND

1. Field

Exemplary embodiments of the invention relate to a backlight unit and a display device including the backlight unit, and more particularly, to a backlight unit including a point light source and a display device including the backlight unit.

2. Description of the Related Art

A liquid crystal display ("LCD") device is a type among flat panel display ("FPD") devices that have gained wide acceptance. An LCD device includes a display panel including two display substrates in which electrodes are disposed and a liquid crystal layer interposed between the two display substrates. In such an LCD device, liquid crystal molecules of the liquid crystal layer are rearranged by voltages that are applied to the electrodes, thereby adjusting the amount of light transmitted through the display panel to display an image by the LCD device.

An LCD device, which is a passive-matrix light emitting device, includes the display panel displaying an image and a backlight unit ("BLU") generating and providing light to the display panel. A backlight unit is classified into a direct-type backlight unit, an edge-type backlight unit, a corner-type backlight unit, and the like, based on a position of a light source in the backlight unit.

SUMMARY

One or more exemplary embodiments of the invention are directed to a backlight unit which achieves luminance uniformity through the use of a reduced number of point light sources, and contributes to an enhanced display quality of a display device including the backlight unit by reducing or effectively preventing a hot spot phenomenon therein.

According to an exemplary embodiment of the invention, a backlight unit includes: a point light source which generates light; a light guide plate defining: an upper surface thereof and a lower surface thereof opposing one another, a side surface thereof provided in plural and each connecting the upper surface and the lower surface to each other, and among the plural side surfaces: a light-incident side surface thereof at which the point light source is disposed and on which is incident the light generated from the point light source; and a reflective side surface thereof which is adjacent to the light-incident side surface and reflects light within the light guide plate, and which forms a first angle with respect to the light-incident side surface; and a wavelength converting unit between the light-incident side surface of the light guide plate and the point light source.

Among opposing ends of the light-incident side surface, the point light source may be disposed at an end adjacent to the reflective side surface.

The light incident on the light-incident side surface of the light guide plate may emit through the upper surface of the light guide plate.

The first angle may be an acute angle.

The first angle may be greater than or equal to about 70 degrees and less than about 90 degrees.

The backlight unit may further include a reflective member disposed on the reflective side surface of the light guide plate.

The reflective member may include at least one of a white reflective film and a silver (Ag) reflective film.

The point light source may be provided in plural and include a first point light source and a second point light source opposing one another.

Among the side surfaces, the light guide plate may further define a first light-incident side surface at which the first point light source is disposed and on which is incident the light generated from the first point light source, and a first reflective side surface which is adjacent to the first light-incident side surface and reflects light within the light guide plate, and which forms the first angle with respect to the first light-incident side surface.

Among the side surfaces, the light guide plate may further define a second light-incident side surface at which the second point light source is disposed and on which is incident the light generated from the second point light source, and a second reflective side surface adjacent to the second light-incident side surface and reflects light within the light guide plate, and which forms the first angle with respect to the second light-incident side surface.

The first reflective side surface and the second reflective side surface may form a second angle therebetween.

The second angle may be an obtuse angle.

The second angle may be in a range of about 140 degrees to about 180 degrees.

The point light source may be a blue light emitting diode.

The wavelength converting unit may include: a glass tube having a polygonal or elliptical cross section; and a phosphor disposed in the glass tube.

The phosphor may include quantum dot particles.

The phosphor may include at least one of a sulfide-based metal, a silicon (Si)-based metal, and a nitride-based metal.

The backlight unit may further include a wavelength converting unit holder in which the wavelength converting unit is accommodated, and the light guide plate may be fixed and supported by the wavelength converting unit holder with the wavelength converting unit accommodated therein.

The wavelength converting unit holder may define a first support portion and a second support portion separated from each other to define a space therebetween, and the space defined between the first and second support portions may accommodate therein the upper surface and the lower surface of the light guide plate.

According to another exemplary embodiment of the invention, a display device includes: a backlight unit which provides a light; and a display panel which displays an image with the light provided by the backlight unit. The backlight unit includes: a point light source which generates the light; a light guide plate defining an upper surface thereof and a lower surface thereof opposing one another, a side surface provided in plural each connecting the upper surface and the lower surface to each other, and among the plural side surfaces, a light-incident side surface thereof at which the point light source is disposed and on which is incident the light generated from the point light source; and a reflective side surface thereof which is adjacent to the light-incident side surface and reflects light within the light guide plate, and which forms a first angle with respect to the light-incident side surface; and a wavelength converting unit between the light-incident side surface of the light guide plate and the point light source.

BRIEF DESCRIPTION OF THE DRAWINGS

The above and other features of the invention will be more clearly understood from the following detailed description taken in conjunction with the accompanying drawings, in which.

DETAILED DESCRIPTION

Figure 1:
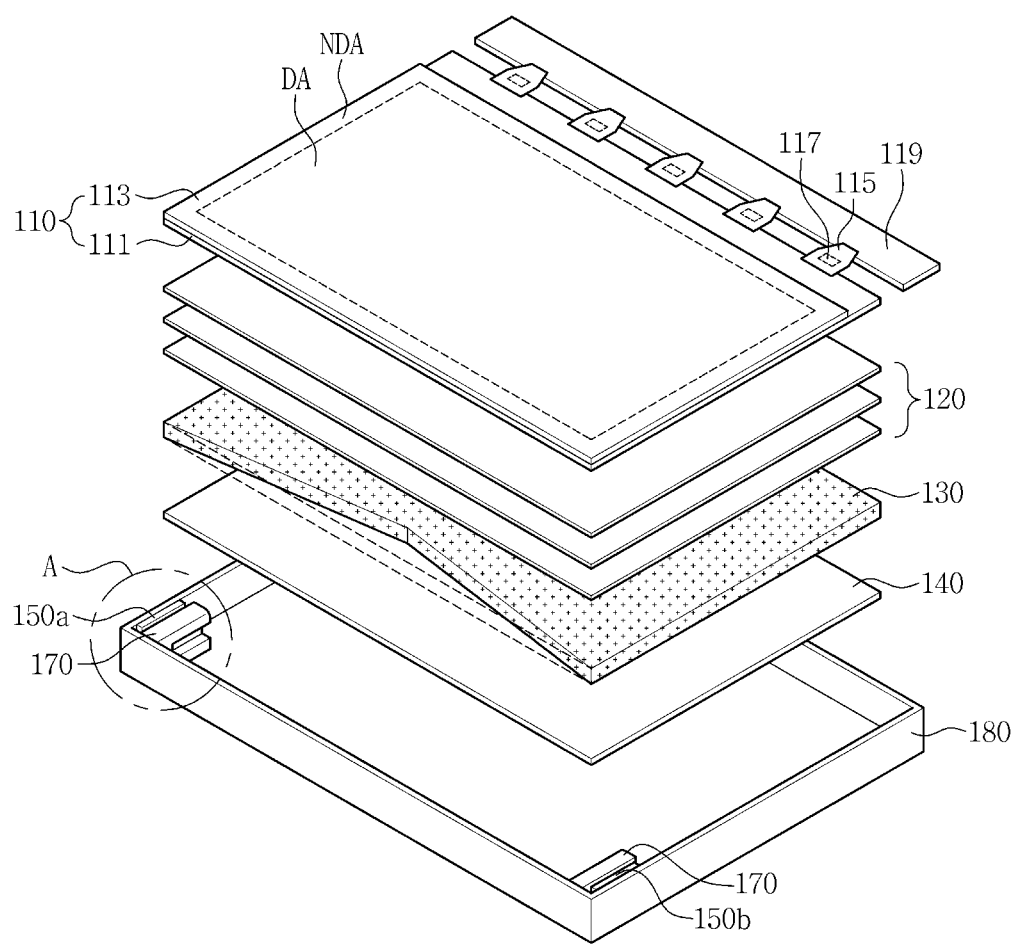
FIG. 1 is an exploded perspective view illustrating an exemplary embodiment of a display device according to the invention.

Exemplary embodiments will now be described more fully hereinafter with reference to the accompanying drawings.

Although the invention can be modified in various manners and define several exemplary embodiments, specific exemplary embodiments are illustrated in the accompanying drawings and will be mainly described in the specification. However, the scope of the invention is not limited to the specific exemplary embodiments and should be construed as including all the changes, equivalents, and substitutions included in the spirit and scope of the invention.

Throughout the specification, when an element is referred to as being "connected" to another element, the element may be physically and/ or "electrically connected" to the other element with one or more intervening elements interposed therebetween. In contrast, when an element is referred to as being "directly connected" to another element, the element may be physically and/ or "electrically connected" to the other element with no intervening element interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," and the like, may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of exemplary embodiments.

When it is determined that a detailed description may make the purpose of the invention unnecessarily ambiguous in the description of the invention, such a detailed description will be omitted. In addition, the same components and corresponding components are given the same reference numeral.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of a display device according to the invention are explained with respect to a liquid crystal display ("LCD") device. However, the display device is not limited thereto, and features of the invention may also be applied to any of a number of display devices that display an image using light generated by and received from a backlight unit.

A corner-type backlight unit includes a light guide plate, and point light sources at an edge portion of the light guide plate. To achieve luminance uniformity, the number of point light sources disposed relative to the light guide plate may increase, thus resulting in a hot spot phenomenon caused by light leakage within the backlight unit.

Figure 2:
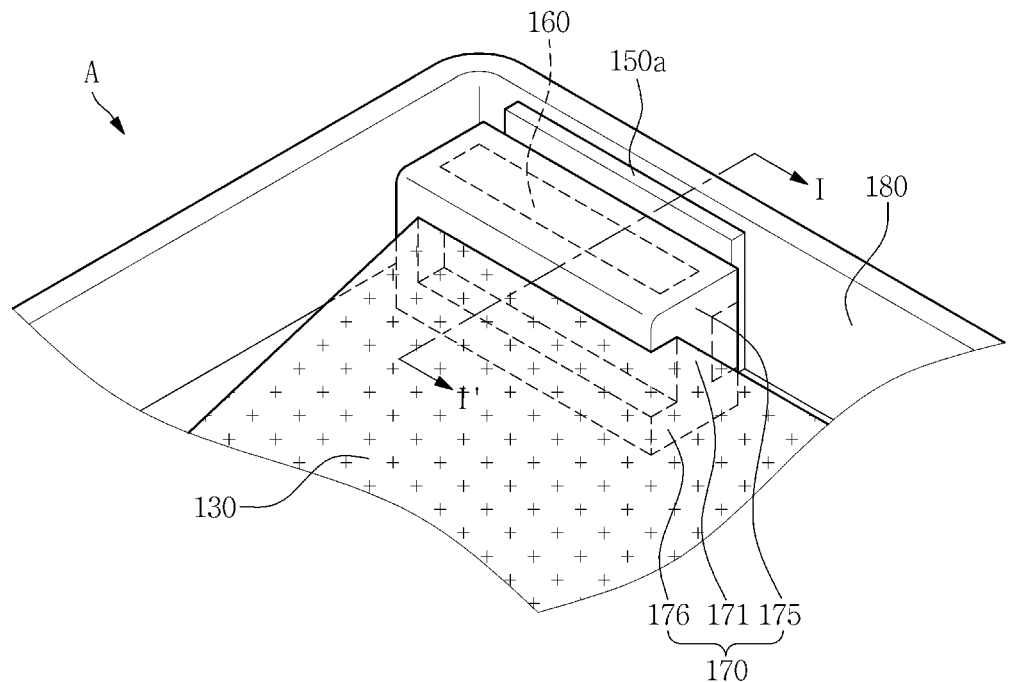
FIG. 2 is an enlarged perspective view illustrating portion "A" of FIG. 1.
Figure 3:
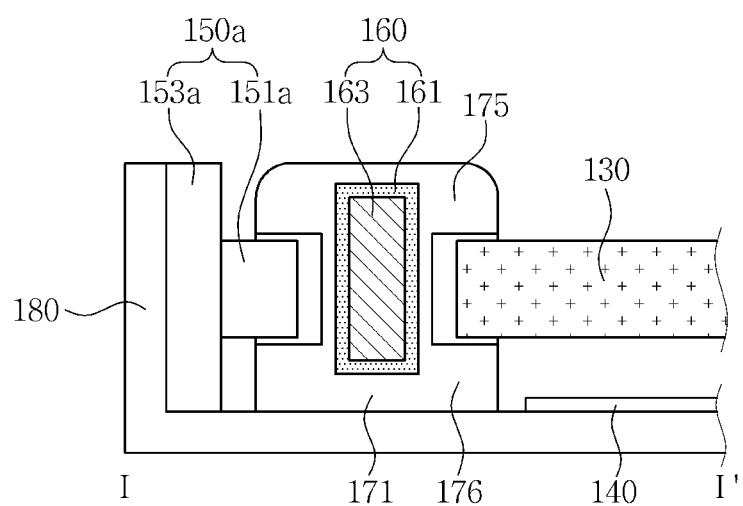
FIG. 3 is a cross-sectional view taken along line I-I' of FIG. 2.

FIG. 1 is an exploded perspective view illustrating an exemplary embodiment of a display device including a backlight unit according to the invention. FIG. 2 is an enlarged perspective view illustrating portion "A" of FIG. 1. FIG. 3 is a cross-sectional view taken along line I-I' of FIG. 2.

Referring to FIGS. 1, 2 and 3, the exemplary embodiment of a display device according to the invention includes a display panel 110 which displays an image, an optical sheet 120, a light guide plate 130, a reflective sheet 140, a first light source unit 150a, a second light source unit 150b, a wavelength converting unit 160 provided in plural, a wavelength converting unit holder 170 provided in plural, and an accommodating frame 180.

As used herein, the optical sheet 120, the light guide plate 130, the reflective sheet 140, the first light source unit 150a, the second light source unit 150b, the wavelength converting units 160, the wavelength converting unit holders 170, the accommodating frame 180, and the like, are collectively referred to as a backlight unit.

The display panel 110 may be provided in a quadrangular planar shape and displays an image with light provided from the backlight unit, by receiving an externally applied electric signal. The display panel 110 includes a display area DA at which an image is displayed and a non-display area NDA surrounding the display area DA and at which an image is not displayed.

The display panel 110 may include a first display substrate 111, a second display substrate 113 opposing the first display substrate 111, and a liquid crystal layer (not illustrated) between the first and second display substrates 111 and 113.

The first display substrate 111 includes therein a pixel electrode provided in plural and arranged in a matrix form on a first base substrate, a thin film transistor applying a driving voltage to each of the pixel electrodes, and various signal lines for driving the pixel electrode and the thin film transistor.

The second display substrate 113 is disposed to oppose the first display substrate 111, and includes therein a common electrode including or formed of a transparent conductive material, and a color filter, on a second base substrate. The color filter may include a red, green and/or blue color filter, by way of example, but the invention is not limited thereto.

The liquid crystal layer (not illustrated) is interposed between the first and second display substrates 111 and 113, and orientations of liquid crystal molecules of the liquid crystal layer are rearranged by an electric field formed between the pixel electrode and the common electrode. The rearranged liquid crystal layer adjusts a level of the light emitted from the backlight unit which is transmitted through the display panel 110. The light having the adjusted level of transmittance is transmitted through the color filter of the display panel 110, and an image is displayed outwardly from the display device.

In addition, a lower polarizer (not illustrated) and an upper polarizer (not illustrated) may further be disposed on a lower surface of the first display substrate 111 and an upper surface of the second display substrate 113, respectively. The upper polarizer and the lower polarizer may each have a planar area corresponding to a planar area of the display panel 110.

The upper polarizer may transmit a predetermined component of polarized light from among externally supplied light incident thereto, and may absorb or block the remainder of the externally supplied light. The lower polarizer may transmit a predetermined component of polarized light from among the light emitted from the backlight unit and incident thereto, and may absorb or block the remainder of the light emitted from the backlight unit.

A driving circuit board 119 may be disposed extended laterally from at least one side of the display panel 110. The driving circuit board 119 may provide various control signals and power signals to the display panel 110 for driving the display panel 110.

The display panel 110 and the driving circuit board 119 may be electrically connected to one another by one or more flexible printed circuit board ("FPCB") 115. The FPCB 115 may be a chip-on-film ("COF") structure or a tape-carrier-package ("TCP") structure, and the number of the FPCB 115 may vary based on, for example, a size and a driving scheme, of the display panel 110.

A driving chip 117 may be mounted on the FPCB 115. The driving chip 117 may generate various driving signals for driving the display panel 110. The driving chip 117 may be a single chip in which a timing controller and a data driving circuit are integrated with one another, and may be referred to as, for example, a driver integrated circuit ("IC") or a source integrated circuit ("IC").

The optical sheet 120 is disposed on the light guide plate 130, and may serve to diffuse or collimate light transmitted from the light guide plate 130. The optical sheet 120 may collectively include plural sheets such as a diffusion sheet, a prism sheet and a protective sheet, but the invention is not limited thereto. The diffusion sheet, the prism sheet and the protective sheet are sequentially stacked on the light guide plate 130.

The prism sheet may collimate light guided and emitted by the light guide plate 130, the diffusion sheet may diffuse the light collimated by the prism sheet, and the protective sheet may protect the prism sheet. Light having passed through the protective sheet may be supplied to the display panel 110.

Figure 4:
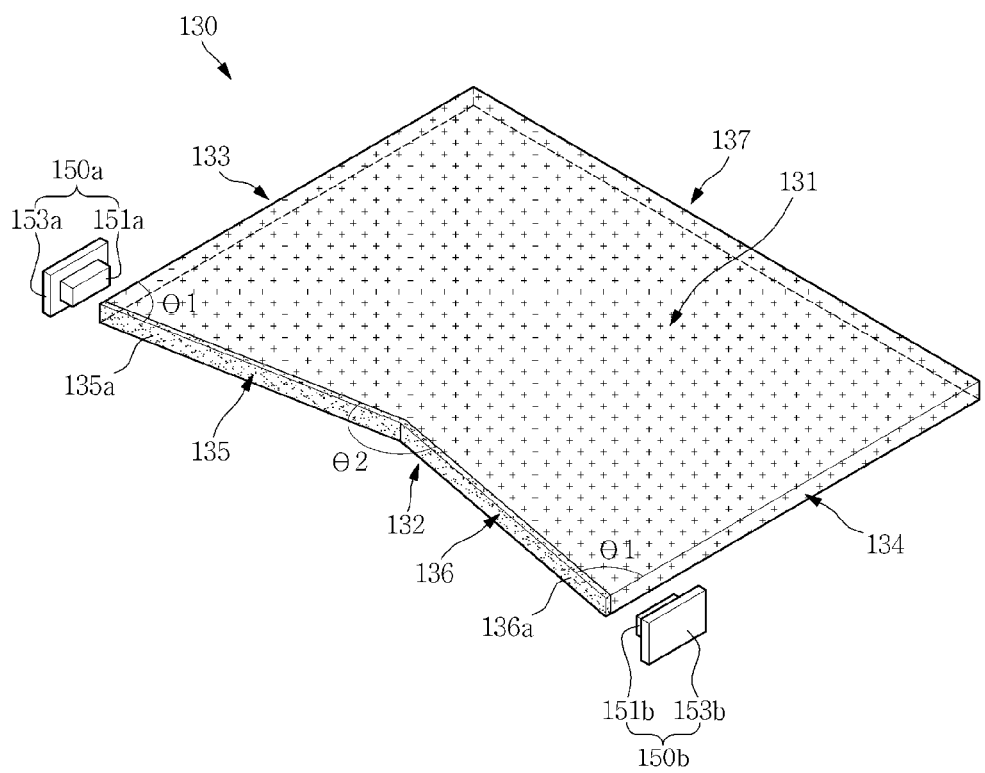
FIG. 4 is a perspective view illustrating an exemplary embodiment of a light guide plate relative to a light source unit of a backlight unit according to the invention.

FIG. 4 is a perspective view illustrating an exemplary embodiment of a light guide plate relative to a light source unit of a backlight unit according to the invention.

Referring to FIG. 4, the light guide plate 130 includes an upper surface 131 and a lower surface 132 disposed to oppose one another, and a plurality of side surfaces 133, 134, 135, 136 and 137 each connects the upper surface 131 and the lower surface 132 to each other. Portions of the light guide plate 130 may define the upper surface 131 thereof, the lower surface 132 thereof and the plurality of side surfaces 133, 134, 135, 136 and 137 thereof.

The plurality of side surfaces 133, 134, 135, 136 and 137 includes a first light-incident side surface 133 which receives a light from the first light source unit 150a, a first reflective side surface 135 forming a first angle θ1 with respect to the first light-incident side surface 133, a second light-incident side surface 134 which receives a light from the second light source unit 150b disposed to oppose the first light source unit 150a, and a second reflective side surface 136 forming the first angle θ1 with respect to the second light-incident side surface 134.

In addition, the first light source unit 150a may be disposed at an edge (e.g., end) of the first light-incident side surface 133, and the second light source unit 150b may be disposed at an edge (e.g., end) of the second light-incident side surface 134. Among respective opposing ends of a length of the first light-incident side surface 133, the first light source unit 150a is disposed at one of the opposing ends. Similarly, among respective opposing ends of a length of the second light-incident side surface 134, the second light source unit 150b is disposed at one of the opposing ends. Each of the one opposing ends is at a same side of the light guide plate 130, that is, a side where the reflective side surface of the light guide plate 130 is disposed.

Referring again to FIG. 3, the first and second light source units 150a and 150b may be disposed at a sidewall of the accommodating frame 180. The sidewall extends from a bottom portion of the accommodating frame 180. Portions of the accommodating frame 180 may define the sidewall thereof and the bottom portion thereof.

The first angle θ1 may be an acute angle. For example, the first angle θ1 may be greater than or equal to about 70 degrees and less than about 90 degrees.

In addition, the first reflective side surface 135 may form a second angle θ2 with respect to the second reflective side surface 136. The second angle θ2 may be an obtuse angle, for example, in a range of about 140 degrees to about 180 degrees. The first and second reflective side surfaces 135 and 136 may collectively define a whole of a reflective side surface.

The light guide plate 130 may receive the lights from the first light source unit 150a and the second light source unit 150b, and emit the lights through the upper surface 131. In such an exemplary embodiment, lights that respectively progress toward the first reflective side surface 135 and the second reflective side surface 136 from among the lights incident on the first light-incident side surface 133 and the second light-incident side surface 134 may undergo diffuse reflection to be uniformly distributed within the light guide plate 130.

To enhance reflection efficiency, reflective members 135a and 136b may further be provided on the first reflective side surface 135 and the second reflective side surface 136, respectively. The reflective members 135a and 136b may be disposed on an outer surface of the first reflective side surface 135 and the second reflective side surface 136, respectively, but the invention is not limited thereto. The reflective members 135a and 136b may include at least one of a white reflective film and a silver (Ag) reflective film. The reflective members 135a and 136b may be attached in a tape form.

Further, a pattern (not illustrated) such as a groove or a protrusion may be defined at the first reflective side surface 135 and/or the second reflective side surface 136 of the light guide plate 130 to cause diffuse reflection, thereby enhancing reflection efficiency.

The light guide plate 130 is described herein as having a planar shape, that is, a plate, for ease of description. While the light guide plate 130 is described as a plate, such as having a relatively large cross-sectional thickness for ease of description, the invention is not limited thereto. According to exemplary embodiments, the light guide plate 130 may be provided in a sheet or film shape for which the cross-sectional thickness is smaller than that of the plate and is relatively small as compared to the planar size thereof, to achieve slimness of the display device. The light guide plate 130 is to be understood as having a concept that includes not only a plate but also a film which guides light provided from the first and second light source units 150a and 150b.

The light guide plate 130 may include or be formed of a light-transmissive material, for example, an acrylic resin such as poly(methyl methacrylate) ("PMMA") or polycarbonate ("PC") to help guide light efficiently.

Referring to FIGS. 1, 2 and 3, the reflective sheet 140 may be formed of, for example, polyethylene terephthalate ("PET") to have reflectivity. One surface of the reflective sheet 140 defined by the reflective sheet 140 may be coated with a diffusion layer containing, for example, titanium dioxide ($TiO_2$) to have reflectivity. A body of the reflective sheet 140 may be formed of a material containing a metal, such as silver (Ag) to have reflectivity.

The first light source unit 150a may include a first point light source 151a which generates light and a first light source substrate 153a on which the first point light source 151a is mounted. The second light source unit 150b may include a second point light source 151b which generates light and a second light source substrate 153b on which the second point light source 151b is mounted.

Each of the first light source unit 150a and the second light source unit 150b may include one or more light emitting diode ("LED") chip (not illustrated) and/or a package (not illustrated) accommodating the LED chip therein. In an exemplary embodiment, for example, the LED chip may be a gallium nitride (GaN)-based LED emitting blue light.

The first light source substrate 153a and the second light source substrate 153b may be one of a printed circuit board ("PCB") and a metal printed circuit board ("MPCB").

The wavelength converting unit 160 is interposed between the first light source unit 150a and the light guide plate 130, and between the second light source unit 150b and the light guide plate 130. The wavelength converting unit 160 includes a tube 161 such as including or formed of glass and a phosphor 163 which is encapsulated within the glass tube 161.

The glass tube 161 encapsulates the phosphor 163 therein, and reduces or effectively prevents the infiltration of external moisture to the phosphor 163. The glass tube 161 may have a polygonal or elliptical cross section.

The phosphor 163 includes a material which converts a wavelength of light provided thereto by the light source unit 150a and/or 150b to a different wavelength of light. In an exemplary embodiment, for example, the phosphor 163 may convert a wavelength of blue light emitted from a blue LED light source to provide white light therefrom.

The phosphor 163 may include quantum dot particles. In addition, the phosphor 163 may further include or may be formed of at least one of a sulfide-based metal, a silicon (Si)-based metal and a nitride-based metal.

In particular, the quantum dot particles are wavelength converting particles which convert an initial wavelength of light to emit light having a predetermined wavelength different from the initial wavelength of light. A wavelength that may be converted by the quantum dot particle may vary based on a diameter of the quantum dot particle. Accordingly, the diameter of the quantum dot particle is adjusted to emit light from the phosphor 163 having a desired color.

In addition, the phosphor 163 may include a green conversion particle and a red conversion particle that may each be a quantum dot particle. The green conversion particle may have a maximum diameter less than that of the red conversion particle.

The quantum dot particle generates far stronger fluorescence in a narrow wavelength band than does a general phosphor material. A core of the quantum dot particle is formed of Group II-IV semiconductor compounds having a nano-size, such as, for example, CdSe, CdTe, and CdS.

In an exemplary embodiment, for example, the quantum dot particle has a maximum diameter in a range of about 2 nanometers (nm) to about 10 nm, and the maximum diameter of the quantum dot particle may be adjusted when used, as necessary.

When the quantum dot particle has a relatively small diameter, a wavelength of light being emitted therefrom decreases to generate light having a blue color. When the quantum dot particle has a relatively large diameter, a wavelength of light being emitted therefrom increases to generate light having a red color.

In addition, the quantum dot particle may be defined by a double-layer structure thereof including an inner core and an outer shell which surrounds the inner core. In an exemplary embodiment, for example, a quantum dot particle formed of CdSe/ZnS includes an inner core formed of CdSe and an outer shell formed of ZnS.

A detailed description pertaining to the wavelength conversion of light by the quantum dot particle will be provided hereinbelow. In an exemplary embodiment, for example, an initial blue light emitted from a blue LED light source is transmitted through a quantum dot particle. A light transmitted through a quantum dot particle having a relatively small diameter is converted into a green light, a light transmitted through a quantum dot particle having a relatively large diameter is converted into a red light, and a light transmitted between the quantum dot particle having the relatively small diameter and the quantum dot particle having the relatively large diameter is emitted as a blue light.

In this manner, the three colors of the red, green and blue lights emitted from quantum dot particles are mixed to form a white light. The quantum dot particle having the relatively small diameter may be a green conversion particle, and the quantum dot particle having the relatively large diameter may be a red conversion particle.

Figure 5:
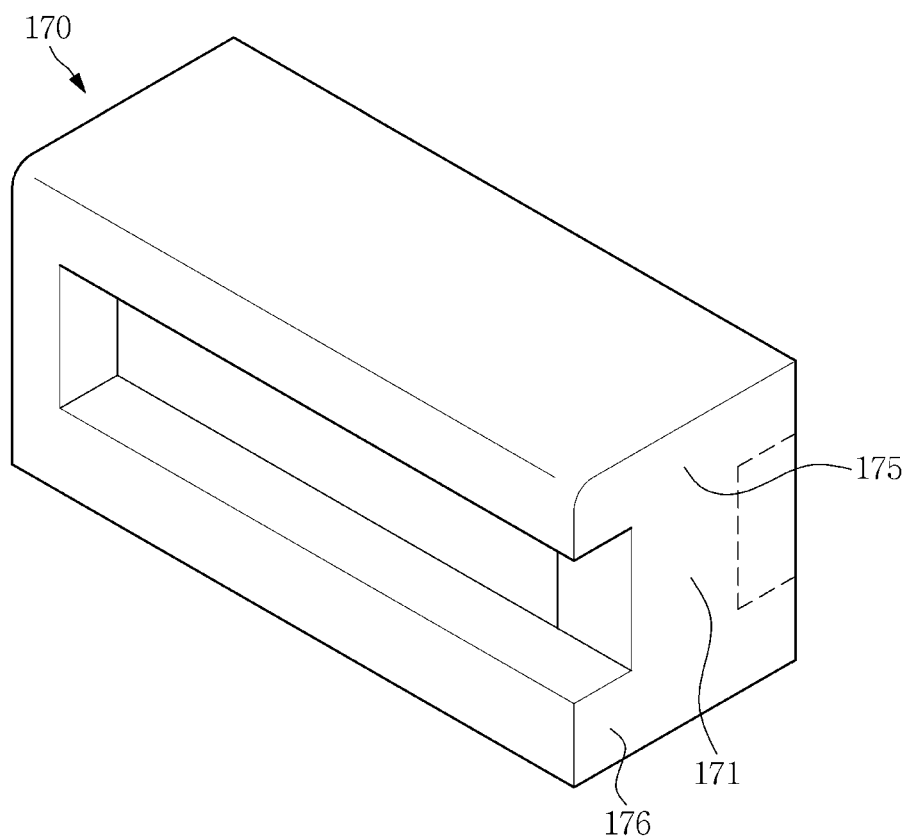
FIG. 5 is a perspective view illustrating an exemplary embodiment of a wavelength converting unit holder of a backlight unit according to the invention.
Figure 6:
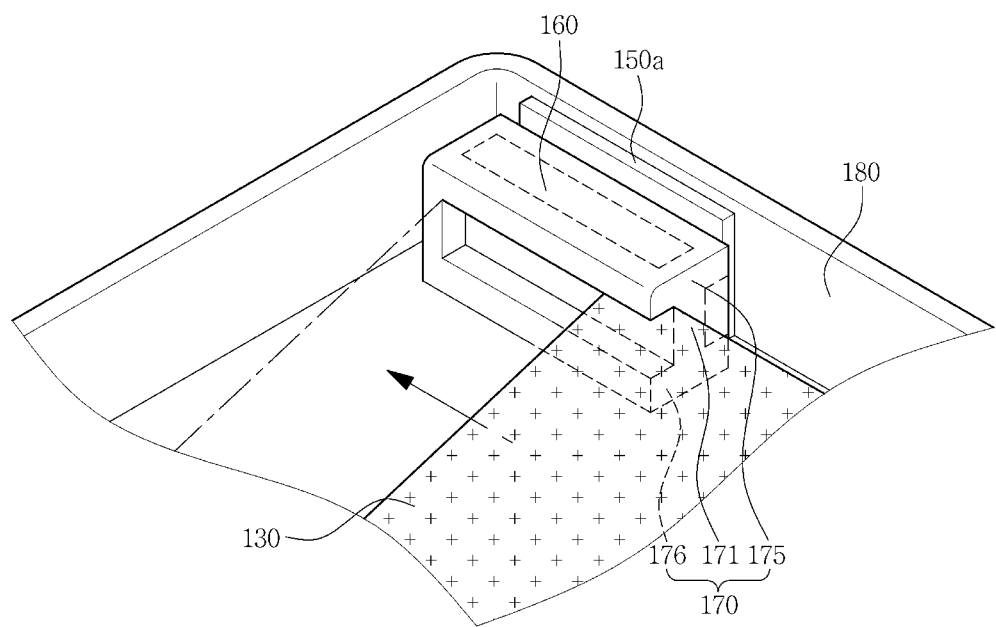
FIG. 6 is a perspective view of an assembled state of a light guide plate and a wavelength converting unit holder of a backlight unit according to the invention.

FIG. 5 is a perspective view illustrating an exemplary embodiment of a wavelength converting unit holder of a backlight unit according to the invention. FIG. 6 is a perspective view of an assembled state of a light guide plate and the wavelength converting unit holder according to the invention.

Referring to FIGS. 5 and 6, the wavelength converting unit holder 170 may accommodate the wavelength converting unit 160 therein, and the light guide plate 130 may be fixed to the wavelength converting unit holder 170 to be supported thereby.

The wavelength converting unit holder 170 may include a body portion 171 accommodating the wavelength converting unit 160 therein, and a first support portion 175 and a second support portion 176 each extending from the body portion 171 and respectively disposed at the upper surface 131 and the lower surface 133 of the light guide plate 130. The light guide plate 130 may be slidably coupled between the first support portion 175 and the second support portion 176 as indicated by the arrow in FIG. 6. Portions of the wavelength converting unit holder 170 may define the body portion 171 thereof, the first support portion 175 thereof and the second support portion 176 thereof. The first and second support portions 175 and 176 may define a space or groove in the wavelength converting unit holder 170 at which the light guide plate 130 may be slidably coupled to the wavelength converting unit holder 170.

Referring to FIGS. 3 and 6, portions of the wavelength converting unit holder 170 may further define the first support portion 175 thereof and the second support portion 176 thereof which extend to face a sidewall of the accommodating frame 180 at which a light source unit is disposed. Similar to that described for the light guide plate 130, the light source unit may be slidably coupled between the first support portion 175 and the second support portion 176 which extend to face the sidewall of the accommodating frame 180.

The wavelength converting unit holder 170 may be coupled to the accommodating frame 180 through hook coupling, screw coupling, double-sided tape coupling, and the like.

Referring to FIGS. 1, 2 and 3, the accommodating frame 180 maintains an overall framework of the display device, and protects various components accommodated therein. The accommodating frame 180 may support various components such as, for example, the optical sheet 120, the light guide plate 130, the reflective sheet 140, the first light source unit 150a, the second light source unit 150b, the wavelength converting unit 160 and the wavelength converting unit holder 170.

The accommodating frame 180 may include or be formed of a metal having relativley high rigidity and relativley high heat dissipation properties. In an exemplary embodiment, for example, the accommodating frame 180 may include or may be formed of at least one of stainless steel, aluminum (Al), an Al alloy, magnesium (Mg), a Mg alloy, copper (Cu), a Cu alloy, and an electro-galvanized steel sheet.

Figure 7:
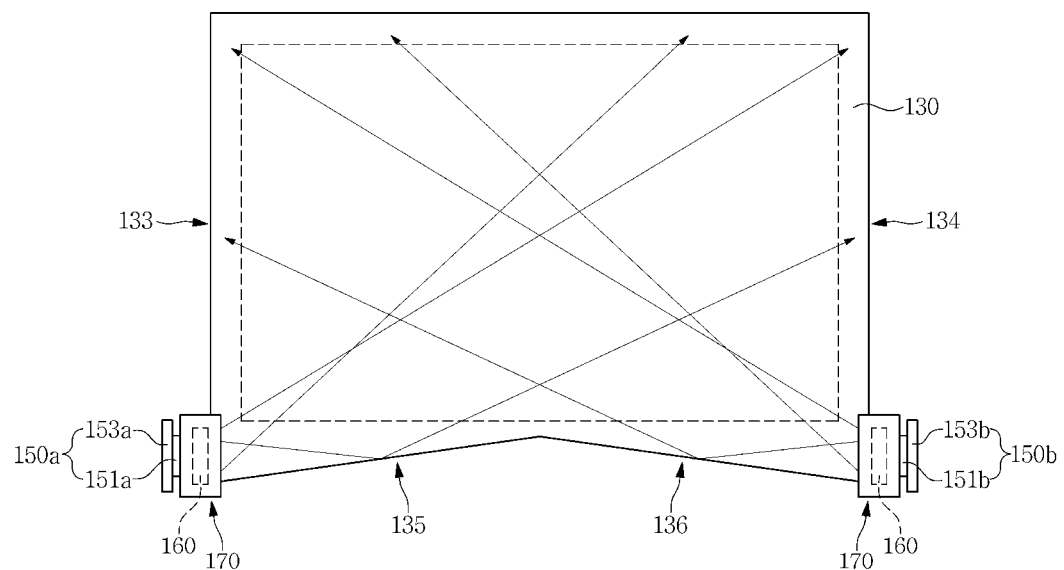
FIG. 7 is a top plan view illustrating progression paths of lights incident on an exemplary embodiment of a light guide plate of a backlight unit according to the invention.

FIG. 7 is a top plan view illustrating progression paths of lights incident on an exemplary embodiment of a light guide plate of a backlight unit according to the invention.

Referring to FIG. 7, a light generated by and emitted from the first light source unit 150a is incident on the first light incident side surface 133 of the light guide plate 130 after passing through the wavelength converting unit 160, and a light generated by and emitted from the second light source unit 150b is incident on the second light incident side surface 134 of the light guide plate 130 after passing through the wavelength converting unit 160.

Lights that progress toward the first reflective side surface 135 and the second reflective side surface 136 from among the lights incident on the first light incident side surface 133 and the second light-incident side surface 134 may undergo diffuse reflection to be uniformly distributed within the light guide plate 130.

Figure 8:
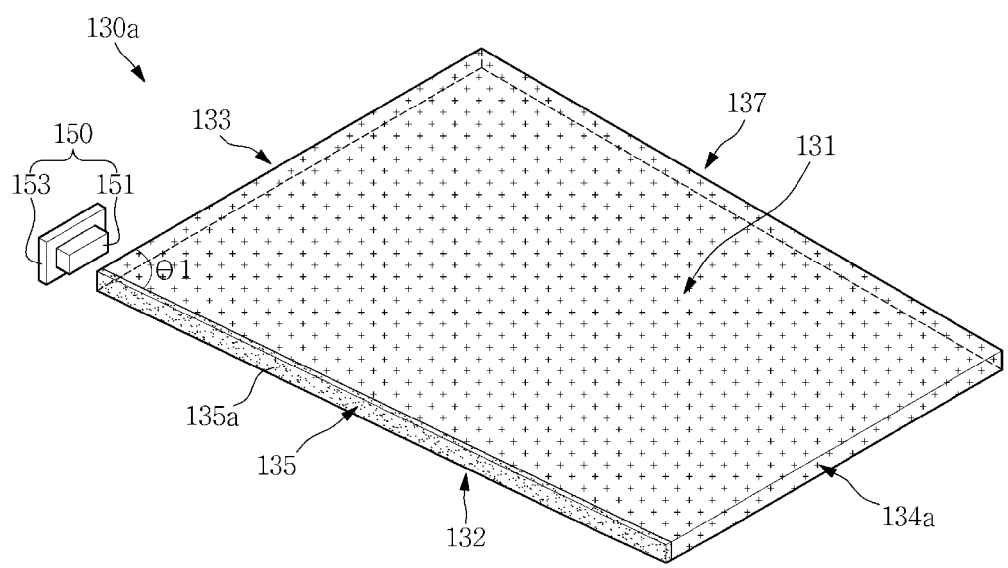
FIG. 8 is a perspective view illustrating another exemplary embodiment of a light guide plate relative to a light source unit of a backlight unit according to the invention.

FIG. 8 is a perspective view illustrating another exemplary embodiment of a light guide plate relative to and a light source unit according to the invention. Description pertaining to the light guide plate in FIG. 8 which has been provided for the light guide plate in FIG. 4 will be omitted herein for conciseness.

Referring to FIG. 8, the exemplary embodiment of the light guide plate 130a according to the invention includes an upper surface 131 and a lower surface 132 disposed to oppose one another, and a plurality of side surfaces 133, 134a, 135 and 137 each connecting the upper surface 131 and the lower surface 132 to each other.

The plurality of side surfaces 133, 134a, 135, and 137 include a light-incident side surface 133 which receives lights from the light source unit 150, and a reflective side surface 135 forming the first angle $\theta 1$ with respect to the light-incident side surface 133. A whole of the reflective side surface 135 may form the first angle θ1 with respect to the light-incident side surface 133. The backlight unit including the light guide plate 130a of FIG. 8 may include only one light source unit 150. The reflective side surface 135 may define a whole reflective side surface of the light guide plate 130a.

In addition, the light source unit 150 may be disposed at an edge of the first incident side surface 133, and the first angle θ1 may be an acute angle. For Example, the first angle θ1 may be greater than or equal to about 70 degrees and less than about 90 degrees.

The lights emitted from the light source unit 150 are incident on the light-incident side surface 133 of the light guide plate 130a, and a light that progresses toward the reflective side surface 135 from among the lights incident on the light-incident side surface 133 may undergo diffuse reflection to be uniformly distributed within the light guide plate 130a.

As set forth above, according to one or more exemplary embodiments, the backlight unit and the display device including the backlight unit may achieve luminance uniformity through the use of a reduced number of point light sources therein.

Accordingly, manufacturing costs may be reduced, and display quality may be enhanced by reducing or effectively preventing a hot spot phenomenon due to an increased number of point light sources.

In addition, the backlight unit and the display device including the backlight unit may enhance display quality through the use of the blue light source and the wavelength converting unit.

From the foregoing, it will be appreciated that various exemplary embodiments in accordance with the present disclosure have been described herein for purposes of illustration, and that various modifications may be made without departing from the scope and spirit of the present teachings. Accordingly, the various exemplary embodiments disclosed herein are not intended to be limiting of the true scope and spirit of the present teachings. Various features of the above described and other exemplary embodiments can be mixed and matched in any manner, to produce further embodiments consistent with the invention.

What is claimed is:

1. A backlight unit comprising:
    a first point light source and a second point light source opposing one another; and
    a light guide plate between the first point light source and the second point light source, the light guide plate including:
        a first light-incident side surface, the first point light source facing a first end of the first light-incident side surface;
        a second light-incident side surface facing the first light-incident side surface, the second point light source facing a first end of the second light-incident side surface;
        a first reflective side surface extending directly from the first end of the first light-incident side surface;
        a second reflective side surface extending directly from the first end of the second light-incident side surface toward the first reflective side surface, an end of the first reflective side surface being in contact with an end of the second reflective side surface, and
        a side surface connecting a second end of the first light-incident side surface and a second end of the second light-incident side surface to each other, the side surface facing the first and second reflective side surfaces,
    wherein a first angle between the first light-incident side surface and the first reflective side surface is less than a second angle between the first light-incident side surface and the side surface.

2. The backlight unit of claim 1, wherein a third angle between the first reflective side surface and the second reflective side surface is greater than the second angle.

3. The backlight unit of claim 2, wherein the third angle is an obtuse angle.

4. The backlight unit of claim 3, wherein the third angle is in a range of 140 degrees to 180 degrees.

5. The backlight unit of claim 1, wherein the first and second point light sources are blue light emitting diodes.

6. The backlight unit of claim 1, further comprising:
    a first wavelength converting unit between the first light-incident side surface and the first point light source; and
    a second wavelength converting unit between the second light-incident side surface and the second point light source.

7. The backlight unit of claim 6, wherein the first wavelength converting unit comprises:
    a glass tube having a polygonal or elliptical cross section; and
    a phosphor disposed in the glass tube.

8. The backlight unit of claim 7, wherein the phosphor comprises quantum dot particles.

9. The backlight unit of claim 7, wherein the phosphor comprises at least one of a sulfide-based metal, a silicon (Si)-based metal and a nitride-based metal.

10. The backlight unit of claim 6, further comprising a wavelength converting unit holder in which the first wavelength converting unit is accommodated, wherein the light guide plate is fixed to and supported by the wavelength converting unit holder with the first wavelength converting unit accommodated therein.

11. The backlight unit of claim 10, wherein the wavelength converting unit holder includes a first support portion and a second support portion separated from each other to define a space therebetween, and the space defined between the first and second support portions accommodates therein an upper surface and a lower surface of the light guide plate.

12. The backlight unit of claim 1, wherein lengths of the first and second reflective side surfaces are greater than a length of the side surface.

13. The backlight unit of claim 1, wherein the first angle is an acute angle.

14. The backlight unit of claim 13, wherein the first angle is greater than or equal to about 70 degrees and less than 90 degrees.

* * * * *